United States Patent [19]

Howie et al.

[11] 4,345,330

[45] Aug. 17, 1982

[54] LASER ENERGY CONTROL CIRCUIT

[75] Inventors: James B. Howie; John McLeod, both of Edinburgh, Scotland

[73] Assignee: Ferranti Limited, Cheadle, England

[21] Appl. No.: 140,007

[22] Filed: Apr. 14, 1980

[30] Foreign Application Priority Data

Apr. 17, 1979 [GB] United Kingdom ................ 7913353

[51] Int. Cl.³ ............................................. H01S 3/10
[52] U.S. Cl. ...................................... 372/29; 372/38
[58] Field of Search ...................... 331/94.5 S, 94.5 M Primary Examiner—William L. Sikes
Assistant Examiner—Léon Scott, Jr.

Attorney, Agent, or Firm—Kerkam, Stowell, Kondracki & Clarke

[57] ABSTRACT

A laser energy control circuit for a gas-discharge excited laser includes an energy source PSU to supply energy to the gas discharge. First circuit means TR1, TR2 operate to limit the energy supplied to a first value for a first time interval, after which second circuit means A1, A2 allow the energy to rise to a maximum value and then decrease gradually to a second value over a second time interval. Subsequently, third circuit means including amplifiers A3 to A6 operate to maintain the light output of the laser at a desired value.

8 Claims, 2 Drawing Figures

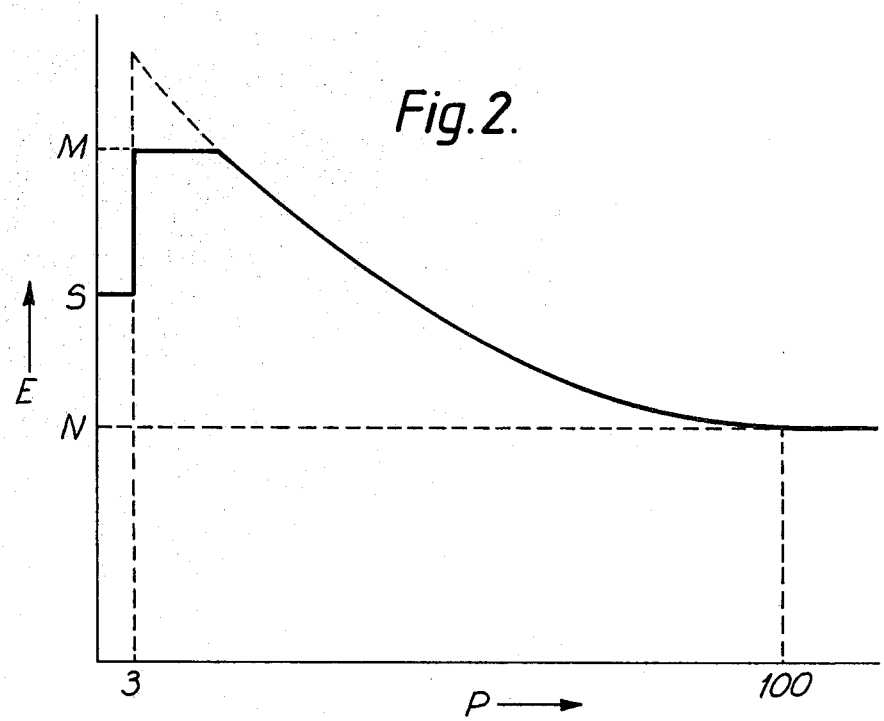

LASER ENERGY CONTROL CIRCUIT

This invention relates to a laser energy control circuit, and particularly to a circuit for compensating for variations in laser output during warm-up.

The problem of fluctuations of output power during warm-up of a laser is particularly noticeable with a "solid" laser in which the active medium is in the form of a rod of solid material.

One of the parameters which controls the output energy from a solid laser is the overall optical power of the elements in the laser interferometer. If this power is negative then the laser is operating in an unstable state, resulting in low output. As the optical power is increased so the laser output will increase up to a peak value. Due to the effects of heating of the laser rod during use, temperature differentials occur across the rod section which result in variations of the refractive index. These will cause changes in the power of the lens formed by the laser rod. This in turn affects the overall optical power of the laser, and hence its output energy.

Once the laser rod has reached its stable operating temperature then the output energy will become stable. The length of time that this takes depends upon a number of parameters, such as pulse repetition rate (in the case of a pulsed laser), pumping energy, coolant temperature and flow rate, and so on. Typically, the warm-up time may be of the order of 10 to 20 seconds.

There are applications where this time is too long, and steps have to be taken to reduce this. One possibility is to control and vary the pumping energy by means of a suitable control circuit. However, a simple servo arrangement responsive to the output power of the laser would not be satisfactory, since for the first pulse after starting there would be no previously-measured power level, and the laser power would be set to its maximum value. This could cause damage to the laser.

Similar problems due to warm-up time may arise with gas-discharge excited gas lasers, in which rapid warm-up may be required from a laser having a continuous or pulsed output.

It is an object of the invention to provide a satisfactory laser energy control circuit for a gas-discharge excited laser which will compensate for variations in the laser output power during warm-up.

According to the present invention there is provided a laser energy control circuit for a gas-discharge excited laser which includes an energy source arranged to supply energy to the gas-discharge, first circuit means operable to limit the energy supplied to a first preset value for a first time interval after the initiation of the gas discharge, second circuit means operable to raise the energy supplied to a maximum value at the end of said first time interval and subsequently to decrease the energy supplied gradually from said maximum value to a normal running value during a second time interval following said first time interval, and third circuit means responsive to the light output of the laser after said time interval to vary the energy supplied in such a manner as to maintain the light output of the laser at a constant value.

An embodiment of the invention will now be described with reference to the accompanying drawings, in which:

FIG. 2 is a graph illustrating the changes in energy caused by the operation of the circuit.

Figure 1:
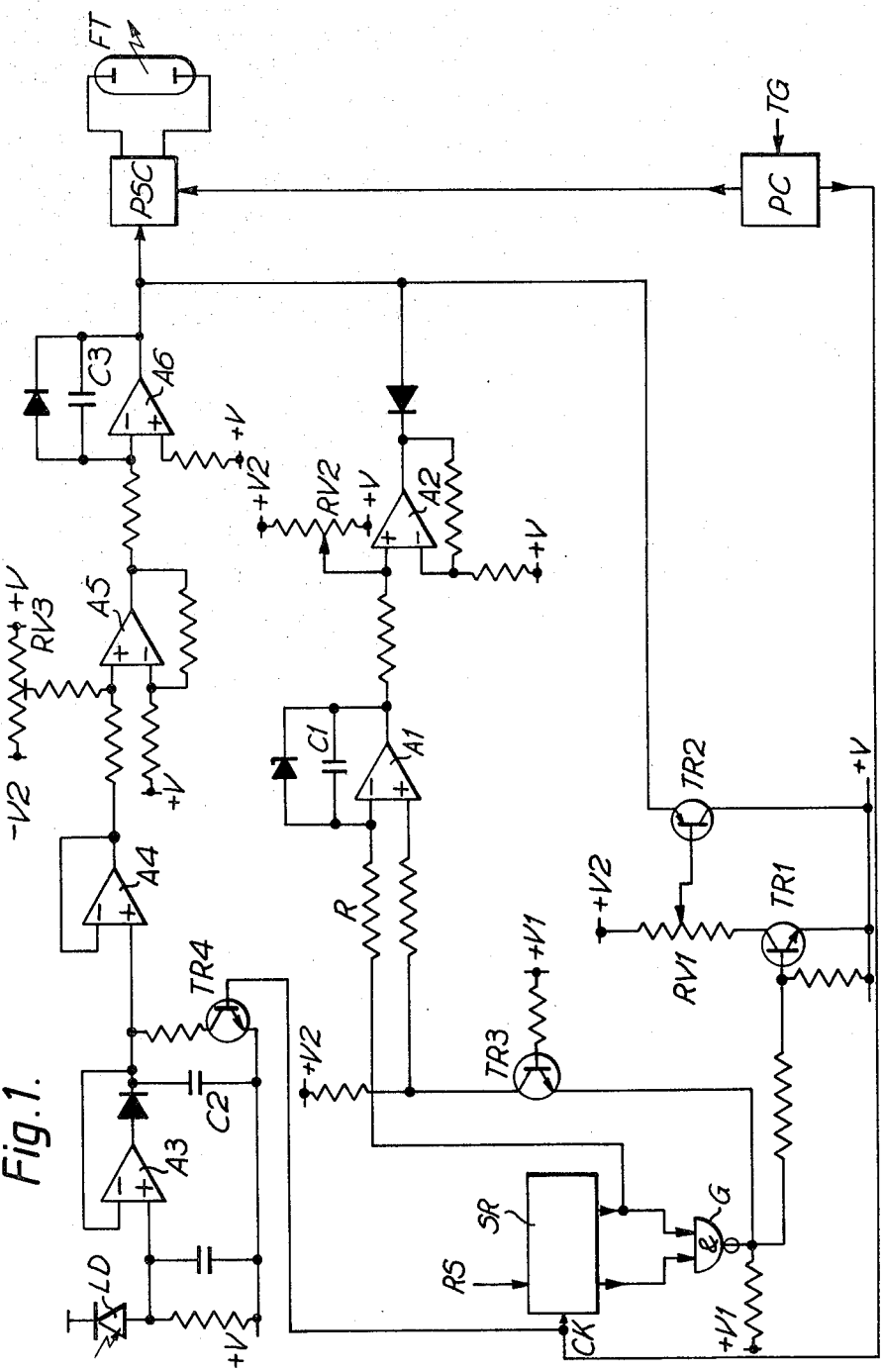
FIG. 1 is a circuit diagram of part of a control circuit.

Referring now to FIG. 1, the voltage-controlled power supply unit PSU is shown connected to a discharge-excited flash tube FT of a solid laser, the other components of the laser being omitted. The power supply unit is one in which the charging voltage is variable in response to a control input voltage. The energisation of the flash tube FT is initiated by a trigger pulse TG applied to a pulse circuit PC which will be described in detail later. The purpose of the remainder of the circuit shown in FIG. 1 is to control the voltage applied to the control input of the power supply.

The control circuit includes a timing circuit comprising a shift register SR clocked by pulses from the pulse circuit PC, and having two of its output connected to the inputs of NAND gate G. The output of the gate G is connected to the base of a transistor TR1 having its emitter connected to a voltage V and its collector connected through a potentiometer RV1 to a voltage V2. The tapping on the potentiometer is connected to the base of a second transistor TR2, having its collector connected to the voltage V and its emitter connected to the control input of the power supply unit. The two transistors make up the "first circuit means" of the invention.

The "second circuit means" comprise two operational amplifiers A1 and A2. The output of gate G is connected by way of a transistor TR3, having its base connected to a fixed voltage, to the non-inverting input of the amplifier A1. The inverting input of the amplifier is connected to one of the outputs of the shift register SR via a resistor R. A feedback path comprising capacitor C1 in parallel with diode D1 is connected between the inverting input and the output of the amplifier. Amplifier A2 has its non-inverting input connected to the output of amplifier A1 and to a potentiometer RV2. A resistive feedback path is connected between the inverting input and the output of the amplifier A2, and the output is also connected via a blocking diode to the control input of the power supply unit.

The "third circuit means" of the invention comprises a servo control loop arranged to control the intensity of the light emitted by the laser. A light-sensitive diode LD is connected by way of a resistance-capacitance network to the non-inverting input of an operational amplifier A3 having a very low leakage current. This amplifier has its inverting input connected to its output and operates as a "sample-and-hold" circuit with capacitor C2 and transistor TR4 connected in parallel across the amplifier output. The base of the transistor is connected to the clock pulse input of the shift register SR.

The output of amplifier A3 is connected to the non-inverting input of an operational amplifier A4, operating as a low-leakage-input buffer amplifier. The output of amplifier A4 is connected through a summing resistor to the non-inverting input of operational amplifier A5. Also connected to the same input through a further summing resistor is a potentiometer RV3, which is used to set the desired light output level. The output of summing amplifier A5 is connected to the input of a further amplifier A6 operating as an integrator, and the output of amplifier A6 is connected to the control input of the power supply PSU.

FIG. 2 illustrates the desired characteristic in terms of the energy E applied to the flash tube FT plotted against the number of pulses P.

Referring now to FIG. 2, the normal running value of the energy supplied is denoted by the value N. The circuit described above is operated in such a manner that the starting value of the energy supplied, the value S, is greater than the normal value, and is maintained for a short period, such as a maximum of one second for a laser pulsed at 10 pulses per second. After this time the energy supplied is allowed to rise to a maximum value M which may be limited by a preset control in the power supply PSU. Over the next ten seconds, say, the energy level falls gradually to the normal running value.

In addition to the variations in energy supplied to the flash lamp described above, the circuit also functions to maintain the light output of the laser at a set value, thus compensating for ageing of the flash tube, deterioration of the laser medium and optical components, and so on.

The operation of the circuit will now be described with reference to FIGS. 1 and 2.

Whenever the laser is switched off, even for a short time, the shift SR is reset. Hence whenever the laser is about to be used the register is clear. In this situation there are no outputs from the shift register, and the resulting output from the NAND gate causes the transistors TR1 and TR2 to conduct. The voltage on the emitter of transistor TR2 is dependent upon the setting of potentiometer RV1, and this sets the "start" energy level of the power supply PSU by applying a first control signal to its control input. At this time the integrating amplifier A1 is inoperative owing to the absence of an input on its inverting input and the fact that its non-inverting input, and hence its output, is held at a high voltage V2 since transistor TR3 is not conducting.

Since the laser has not yet functioned, there will be no radiation detected by the light-sensitive diode LD, and hence the error signal at the non-inverting input of summing amplifier A5 will be a maximum. This error will be integrated rapidly by the integrating amplifier A6, but its output voltage will be held to the value determined by transistor TR2. Hence the operation of the servo circuit will be inhibited at this time.

Each trigger pulse is applied to the power supply unit PSU and after a delay will fire the laser. Before the laser fires, the trigger pulse is used to clock the shift register SR, denoting that the laser is about to be fired, and is also used to cause transistor TR4 to conduct and allow sampling capacitor C2 to discharge.

When a suitable number of pulses have been applied to the shift register SR, the output from gate G changes, and transistors TR1 and TR2 cease to conduct. The voltage on the control input to the power supply thus rises to a value determined by the servo circuit, which has by this time responded to the laser output to determine a suitable value for the control signal. At the same time, transistor TR3 conducts and the non-inverting input of amplifier A1 falls, allowing the integrator to function. As the capacitor C1 charges up through resistor R, the output voltage of amplifier A2 falls to a minimum value set by the potentiometer RV2. This provides the second control signal, which falls to a value representing the normal running value of the energy level. The presence of the diode in the output connection of amplifier A2 allows the second control signal voltage to be raised by the servo circuit if this becomes necessary due to the various effects referred to above.

Continued operation of the laser causes the continuous application of clock pulses to the shift register, but these have no effect once the preset count has been reached. As already stated, whenever the laser is stopped, the shift register is reset to zero.

The shift register and operational amplifiers are standard circuits, available in integrated circuit form. The pulse circuit PC is simply a circuit which will provide the necessary delay for clocking the shift register and causing transistor TR4 to conduct. The shift register could be replaced by a simple counter if required.

If the laser is a continuously-operating laser rather than a pulsed laser, then the clock pulses will have to be derived from a suitable clock pulse generator, and the count of the shift register will represent a set period of time rather than a set number of pulses. The sample-and-hold circuit is no longer necessary in this case. However, since the pulsed laser is operated repetitively, the effect is the same.

The way in which the light-sensitive detector LD samples the laser output has not been described, since many different arrangements are possible. Preferably a beam-splitter is used to divert part of the laser output on to a diffuser which is viewed by the detector. The diffuser prevents the laser from being affected by moving "hot-spots" in the laser output. The time constant of the integrator A1, that is the slope of the ramp function, is determined by the values of resistor R and capacitor C1. This time constant may thus be varied by suitable variation of either or both of these components.

The power supply unit PSU must, as already stated, be one which responds to a variable control voltage. In the case of a pulsed laser the supply usually operates to charge a capacitor which is then discharged through the flash tube. In this case the control voltage varies the voltage to which the capacitor is charged. In the case of a continuously-operating laser, such as a gas laser, the power supply is used to produce a continuous discharge in the gaseous active medium, and the voltage or current of this discharge may be varied to control the laser output energy.

What we claim is:

1. A laser energy control circuit for a gas-discharge-excited laser, which includes an energy source arranged to supply energy to the gas discharge at a rate determined by a control voltage, a first circuit connected to said source and arranged to deliver a first control voltage of such a value that the energy supplied is limited to a first value for a first time interval after initiation of the gas discharge, a second circuit connected to said source and arranged to deliver a second control voltage such that said energy supplied increases to a maximum value at the end of said first time interval and subsequently to change the control voltage in such a manner that said energy supplied is decreased gradually from said maximum value to a running value during a second time interval following said first time interval, a timing arrangement responsive to a series of clock pulses to determine the duration of said first time interval, and a third circuit connected to said source and responsive to light output of the laser after said second time interval to vary said control voltage in such a manner that said energy supplied is controlled to maintain said light output of the laser constant.

2. A circuit as claimed in claim 1 in which said clock pulses are trigger pulses of a pulsed laser.

3. A circuit as claimed in claim 1 in which said first circuit comprises a switch operable during said first time interval to apply a first control signal to the energy source.

4. A circuit as claimed in claim 3 in which said first circuit includes a circuit element operable to change the value of said first control voltage.

5. A circuit as claimed in claim 1 in which said second circuit comprises an integrator to apply to said energy source a second control voltage to define a rate at which said energy supplied decreases to said running value.

6. A circuit as claimed in claim 5 in which said second circuit includes a circuit element operable to change said running value of said energy supplied.

7. A circuit as claimed in claim 5 in which said rate at which said energy supplied decreases may be varied by varying a time constant of the integrator.

8. A circuit as claimed in claim 1 in which said third circuit includes a light-sensitive device responsive to the light output of laser.

* * * * *